G. W. HYSER.
WHISTLE.
APPLICATION FILED NOV. 27, 1908.
926,490.
Patented June 29, 1909.
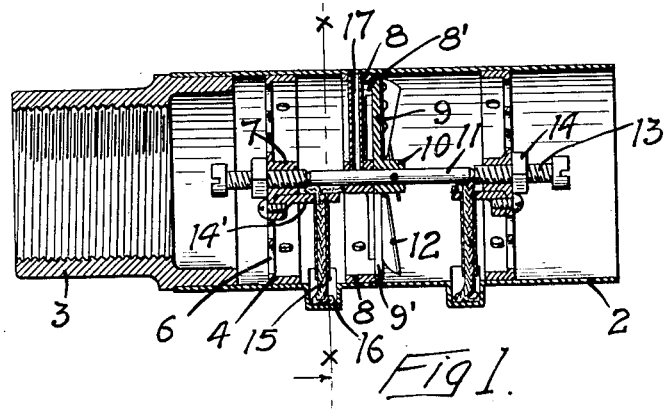
Fig 1.
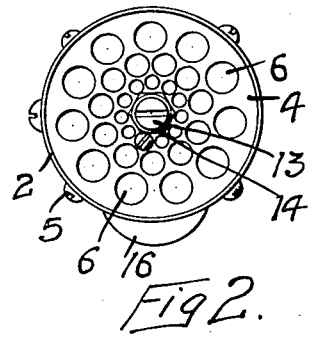
Fig 2.
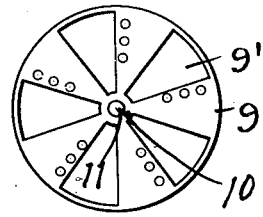
Fig 3.
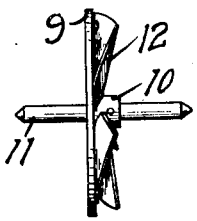
Fig 4.
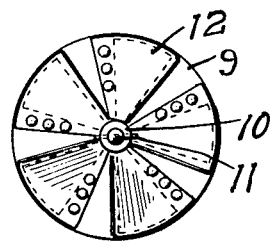
Fig 5.
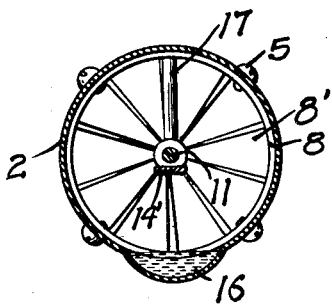
Fig 6. x-x
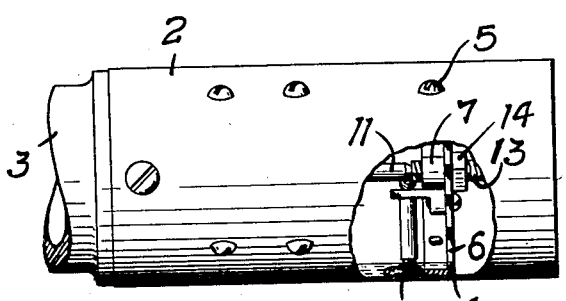
Fig 7.
WITNESSES
INVENTOR
GEORGE W. HYSER
BY
HIS ATTORNEYS

UNITED STATES PATENT OFFICE.

GEORGE WILLIAM HYSER, OF MINNEAPOLIS, MINNESOTA.

WHISTLE.

No. 926,490.   Specification of Letters Patent.   Patented June 29, 1909.

Application filed November 27, 1908. Serial No. 464,655.

*To all whom it may concern:*

Be it known that I, GEORGE WILLIAM HYSER, of Minneapolis, Hennepin county, Minnesota, have invented certain new and useful Improvements in Whistles, of which the following is a specification.

My invention relates to that class of whistles designed to be operated by fluid pressure and adapted for various purposes, but designed particularly for use on automobiles, steam and street cars.

The object of my invention is to simplify and improve the whistle of this type as usually constructed and adapt it for adjustment to produce different tones.

The further object is to provide a whistle, which will be durable and extremely simple and economical in construction.

The invention consists generally in various constructions and combinations all as hereinafter described and particularly pointed out in the claims.

In the accompanying drawings forming part of this specification, Figure 1 is a longitudinal, sectional view of a whistle embodying my invention, Fig. 2 is an end view, Fig. 3 is a detail view of one of the fan disks, Fig. 4 is an edge view of the fan, Fig. 5 is a side view, Fig. 6 is a sectional view on the line X—X Fig. 1, looking in the direction of the arrow, Fig. 7 illustrates a modified construction of cylinder.

In carrying out my invention I make use of a perforated disk within a cylinder and a rotary fan, adapted by its rotation, to close and open the apertures in the disk, causing sound waves of different pitch to be discharged. The principle is well known and I make no claim broadly to the same herein.

2 represents a barrel or cylinder open at each end and provided at one end with an interiorly threaded nipple 3 for convenience in attaching the cylinder to the xhaust of a gas engine. Within the cylinder I arrange disks 4 having flanged edges secured to the walls of the cylinder by any suitable means, as screws 5. These disks are provided with a series of perforations 6 and are arranged a suitable distance apart within the cylinder and are provided with hubs 7. A disk 8 is arranged intermediate to the disk 4 and secured in a similar manner to the walls of the cylinder and provided with a series of radial openings 8'. These openings are triangular in form. A fan is arranged to revolve near the openings 8' and consists of a disk 9 having a hub 10 secured on a shaft 11. The disk 9 has a series of radial openings 9' therein, which extend to a point near the periphery of the disk, but not entirely through to its circumference. A series of thin sheet metal blades 12 are secured to the disk 9 at the edges of the openings therein and project therefrom at an angle and form the blades of the fan lapping over the openings 9' in the disk 9. The blank sections of the disk 9 between the openings or apertures therein are not as wide as the corresponding openings in the disk 8 and consequently passages will be formed, regardless of the position of the disk 9, to allow currents of air to flow through against the fan blades.

The fan, having blades of thin sheet metal, will be much lighter and easier of operation than one having blades pressed or punched out of the metal of the same thickness of which the disk is composed. The ends of the shaft have bearings in set screws 13 mounted in the hubs 7 and provided with lock nuts 14, set screws permitting the longitudinal adjustment of the shaft 11 and the location of the fan blades at different distances with respect to the disk openings, past which the blades revolve. This adjustment allows the tone of the whistle to be varied as desired. It also enables me to take up all wear in the shaft, which I have found, in a rapidly rotating fan of this kind, to be considerable.

Under the bearing at one end of the shaft, an oil receptacle 14' is provided and wicks 15 lead from cups 16 in the wall of the cylinder up to the bearings at the ends of the shaft and contact with the shaft, thus utilizing the oil that is blown out with the exhaust and tends to collect in the bottom of the cylinder. The cups 16 may be omitted, as shown in Fig. 7. An oil tube 17 is also provided through which oil may be introduced to the fan bearing. This device, while designed for use particularly on the exhaust of an automobile gas engine, may be operated by steam or air pressure, if preferred.

I claim as my invention:—

1. A fluid pressure whistle, comprising a cylinder, perforated disks therein, a fan arranged to revolve past the openings in one of said disks, and having a shaft and means for adjusting said shaft lengthwise to vary the distance between the fan and the disk having said openings, substantially as described.

2. A fluid pressure whistle, comprising a cylinder, perforated disks therein, a fan arranged to revolve past the openings in one of said disks, a shaft whereon said fan is secured, set screws mounted in said disks and having bearings to receive the end of said shaft, said screws being capable of adjustment to move said shaft lengthwise.

3. In a fluid pressure whistle, a disk having a series of radial openings therein extending to a point near but not entirely through to the circumference of said disk, and a series of blades of thin sheet metal secured to said disk at the edges of said openings and projecting at an angle with respect to said disk and lapping by the openings therein, and a disk having radial openings of greater width than the width of the blank surfaces between the openings in said fan disk, substantially as described.

In witness whereof, I have hereunto set my hand this 19th day of November 1908.

GEORGE WILLIAM HYSER.

Witnesses:
RICHARD PAUL,
J. A. BYINGTON.